United States Patent Office 3,598,850
Patented Aug. 10, 1971

3,598,850
FERROCENE POLYGLYCOLS
Fred M. Dewey, Denver, Colo., assignor to the United States of America as represented by the Secretary of the Air Force
No Drawing. Filed June 11, 1969, Ser. No. 832,496
Int. Cl. C08g *43/00;* C10l *9/10;* C07f *15/02*
U.S. Cl. 260—439                                    10 Claims

ABSTRACT OF THE DISCLOSURE

A method for synthesizing ferrocene polyglycol copolymers which are useful as components of rocket propellant compositions. The copolymers are formed by effecting a polycondensation-reaction between (1) a bis($\alpha$-hydroxyalkyl) ferrocene, (2) a substituted dihydroxy alcohol and (3) a catalytic amount of boron trifluoride etherate.

BACKGROUND OF THE INVENTION

This invention relates to polymeric derivatives of ferrocene and to a process for their preparation. More particularly, this invention concerns itself with a process for effecting a polycondensation reaction between a dicyclopentadienyliron derivative and a dihydroxy alcohol to form a polyglycol copolymer having iron in the polymer chain.

Ferrocene derivatives are well known to the rocket industry as combustion catalysts for solid propellants. Although a variety of other types of catalysts have been developed (metal chelates and salts, etc.), ferrocene compounds have been found to be especially effective as catalysts for increasing the burn rate of propellant compositions.

The physical properties of the ferrocene compounds used as catalysts are extremely important. Of particular importance are the melting and boiling points of these compounds, and the combination of their physical and structural characteristics which determine their tendency to migrate from the propellant grain to other parts of the rocket motor.

In order to be an effective catalyst, the ferrocene compound must have a high boiling point (low volatility) and a wide liquid range. These properties are important in obtaining good processing characteristics for the propellant mix, to maintain a given concentration of catalyst in the propellant during formulation and subsequent storage, and to preclude grain failure resulting from a phase change of the catalyst during storage. All of these problems have been encountered in the course of ferrocene catalyst development for high-burn-rate propellants. However, one of the major problems concerns the migration of liquid ferrocene catalysts from the propellant into other parts of the motor during storage. The volatility of the catalyst undoubtedly contributes to its migration in a cured propellant, but the structural characteristics of the molecule (e.g., polar groups, long, flexible sidechains) which govern its interactions with other propellant ingredients also are important.

In an attempt to circumvent the problems associated with the ferrocene catalysts used heretofore, it has been found that the problems of volatility and crystallization of ferrocene catalysts and their migration can be abrogated by chemically bonding the ferrocene molecule to the propellant binders. This is accomplished by incorporating ferrocene into a polymer chain which in turn finds utility as a propellant binder. The preparation of the polymeric binders of this invention is accomplished by a polycondensation reaction between a bis($\alpha$-hydroxyalkyl) ferrocene with a substituted dihydroxy alcohol.

Two hypotheses govern the molecular design of the ferrocene polymers of this invention. First, utilization of a long carbon-oxygen chain between ferrocene rings causes the polymer to assume some of the properties of an aliphatic polyether. The chain length can be altered by selection of an appropriate diol. Second, utilization of 1,1'-difunctional ferrocene monomer places the ferrocene moiety in the polymer chain and acts to give added flexibility to the polymer through rotation of the cyclopentadienyl rings about their iron-centered axis.

SUMMARY OF THE INVENTION

In accordance with this invention, ferrocene polyglycol copolymers, especially useful as components of rocket propellants, can be prepared by effecting a polycondensation reaction between a ferrocene derivative and a substituted dihydroxy alcohol. The copolymerized reaction products are viscous liquids possessing molecular weights of about 700 to 850 as well as putty-like solids having molecular weights of up to about 1800. The ferrocene copolymers are useful as propellant binders and burning rate controllers to impart heat stability to rocket propellants.

Accordingly, the primary object of this invention is to provide a new class of ferrocene copolymers and a method for their preparation.

Another object of this invention is to provide a new class of polyglycol copolymers containing iron in the polymer chain.

Still another object of this invention is to provide a new class of ferrocene polyglycol copolymers useful as binder components for rocket propellants.

The above and still other objects and advantages of this invention will become apparent upon consideration of the following detailed description thereof.

DESCRIPTION OF THE PREFERRED EMBODIMENTS

In accordance with this invention it has been found that the above noted objects can be accomplished by effecting a polycondensation reaction between (1) a ferrocene derivative of the kind embraced in the following structural formula:

(I)
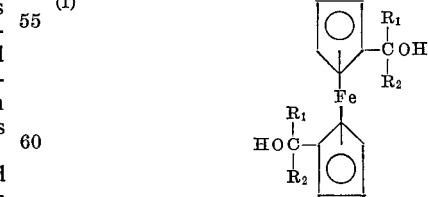

wherein $R_1$ and $R_2$ represent a member of the class consisting of hydrogen and lower alkyl radicals of not more than 8 carbon atoms; (2) a substituted dihydroxy alcohol of the kind embraced in the following structural formula:

(II)  OH—X—OH wherein X represents a divalent radical of the class of alkylene, arylene, alkylarylene, alkyleneoxy and alkylenedioxy radicals of not more than 8 carbon atoms in the case of the alkylene radicals and no more than 12 carbon atoms in the case of the arylene radicals and (3) a catalytic amount of boron trifluoride etherate.

Illustrative examples of the monovalent radicals represented by $R_1$ and $R_2$ in Formula I are: hydrogen and methyl to octyl, inclusive, and the various isomeric forms thereof. Examples which illustrate the substituted dihydroxy alcohols of Formula II are: tetramethylene glycol, hexamethylene glycol, diethylene glycol and triethylene glycol.

The polycondensation reaction products of this invention which are obtained by treating a 1,1'-bis(α-hydroxyalkyl) ferrocene with a substituted dihydroxy alcohol are believed to possess the following structure:

(III)
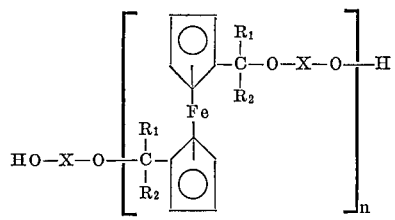

wherein $n$ is a positive integer and $R_1$, $R_2$ and X have the same meanings as given with reference to Formulas I and II.

The proportions of the ferrocene derivative and the dihydroxy alcohol component may be varied from about 1.5 to about 2 equivalents of the diol to about 1 equivalent of the ferrocene. Molecular weight determination on the polymers prepared using slightly more than two equivalents of a diol such as tetramethylene glycol showed that they have an average $n=2$, and these materials are viscous oils at room temperature. Reducing the amount of the diol to 1.5 equivalents results in the formation of rubbery polymers which are insoluble in organic solvents.

The following examples are presented to better illustrate the nature of the invention and how it may be carried into effect. Although these examples depict specific embodiments of the invention, they are not to be construed as limiting the scope of the invention in any way.

EXAMPLE 1

Reaction of 1,1'-bis(1-hydroxyethyl) ferrocene with hexamethylene glycol

A mixture of 1.0 g. of 1,1'-bis(1-hydroxyethyl) ferrocene (3.5 mmoles), 1.0 g. hexamethylene glycol (8.5 mmoles) and 1 drop boron trifluoride etherate was stirred at 50° C. for 3 hours. The mixture was dissolved in methylene chloride and the solution was washed with water, 5 percent sodium bicarbonate, saturated sodium chloride solution, and dried (MgSO₄). Evaporation of the solvent gave a viscous orange oil, 1.5 g.: I.R. (neat) 1085 cm.⁻¹ (C—O); M.W.: 810±40 (VPO).

Analysis (percent): C, 66.3; H, 7.91.

The experiment was repated using 5.5 mmoles hexamethylene glycol. An orange, rubbery polymer resulted which was only partially soluble in organic solvents.

Analysis (percent): Found: C, 66.4; H, 7.09.

EXAMPLE 2

Reaction of 1,1'-bis(1-hydroxyethyl)ferrocene with tetramethylene glycol

The reaction was carried out as in Example 1 using 7.8 mmoles tetramethylene glycol and warming the mixture at 40–50° C. for 2 hours. The product was a viscous orange oil: M.W. 740±40 (VPO).

Analysis (percent): C, 62.8; H, 7.04.

EXAMPLE 3

Reaction of 1,1-bis(1-hydroxyethyl)ferrocene with diethylene glycol

A 3.5-mmole sample of the ferrocene diol was allowed to react with 5.5 mmoles diethylene glycol in the same manner as in Example 1. Thin-layer chromatography showed the presence of a small amount of 1,1'-diethyl-α,α'-epoxyferrocene. The product mixture had a putty-like consistency.

EXAMPLE 4

Reaction of triethylene glycol with 1,1'-bis(1-hydroxethyl) ferrocene

The polymer which was formed using two equivalents of triethylene glycol and allowing the reaction to proceed as in the previous examples was extremely viscous: M.W. 1800±300 (VPO).

From a consideration of the foregoing it can be seen that the present invention provides a simple and economical process for the synthesis of polyglycol copolymers having iron in the polymer chains. These ferrocene copolymers find utility as components in rocket propellant compositions, particularly as binders and burning rate catalysts.

While the invention has been described with particularity in reference to specific embodiments thereof, it is to be understood that the disclosure of the present invention is for the purpose of illustration only and is not intended to limit the invention in any way, the scope of which is defined by the appended claims.

What is claimed is:

1. The method of preparing an iron containing synthetic resinous composition which comprises effecting a polycondensation reaction under heat between reaction components including (1) a ferrocene derivative represented by the general formula:

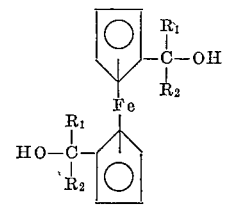

wherein $R_1$ and $R_2$ represent a member of the class consisting of hydrogen and lower alkyl radicals of not more than 8 carbon atoms, (2) a dihydroxy alcohol and (3) boron trifluoride etherate.

2. A method in accordance with claim 1 wherein said ferrocene derivative is 1,1'-bis(1-hydroxyethyl) ferrocene and said dihydroxy alcohol is hexamethylene glycol.

3. A method in accordance with claim 2 wherein said dihydroxy alcohol is tetramethylene glycol.

4. A method in accordance with claim 2 wherein said dihydroxy alcohol is diethylene glycol.

5. A method in accordance with claim 2 wherein said dihydroxy alcohol is triethylene glycol.

6. A compound of the formula:

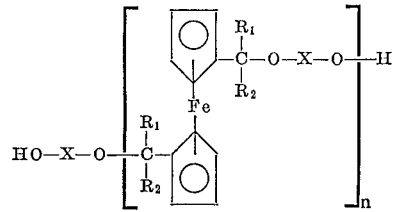

wherein $n$ is a positive integer, $R_1$ and $R_2$ are monovalent radicals selected from the group consisting of hydrogen and lower alkyl radicals of not more than 8 carbon atoms and X is a divalent radical selected from the group consisting of alkylene, arylene, alkylarylene, alkeneoxy and alkylenedioxy radicals of not more than 8 carbon atoms in the case of alkylene radicals and no more than 12 carbon atoms in the case of the arylene radicals.

7. A compound in accordance with claim 6 wherein $R_1$ is H—, $R_2$ is $C_2H_5$— and X is —$(CH_2)_6$—.

8. A compound in accordance with claim 7 wherein X is —$(CH_2)_4$—.

9. A compound in accordance with claim 7 wherein X is —$CH_2CH_2OCH_2$—$CH_2$—.

10. A compound in accordance with claim 7 wherein X is —$CH_2CH_2OCH_2CH_2OCH_2CH_2$—.

References Cited

UNITED STATES PATENTS

| | | | |
|---|---|---|---|
| 3,238,185 | 3/1966 | Neuse | 260—80 |
| 3,322,804 | 5/1967 | Pruett | 260—439 |

OTHER REFERENCES

Valot: Compxes. Rend. 262 C, 1966, p. 403–5.

JAMES E. POER, Primary Examiner

A. P. DEMERS, Assistant Examiner

U.S. Cl. X.R.

44—4; 260—2M